(12) United States Patent
Haruna

(10) Patent No.: US 9,515,847 B2
(45) Date of Patent: Dec. 6, 2016

(54) SYSTEMS AND METHODS FOR ADDING MEDIA CONTENT TO ELECTRONIC MESSAGES

(75) Inventor: Adamu Haruna, Tampere (FI)

(73) Assignee: NOKIA CORPORATION, Espoo (FI)

(*) Notice: Subject to any disclaimer, the term of this patent is extended or adjusted under 35 U.S.C. 154(b) by 1226 days.

(21) Appl. No.: 12/351,474

(22) Filed: Jan. 9, 2009

(65) Prior Publication Data

US 2009/0287784 A1    Nov. 19, 2009

Related U.S. Application Data

(60) Provisional application No. 61/020,140, filed on Jan. 9, 2008.

(51) Int. Cl.
*H04L 12/58* (2006.01)

(52) U.S. Cl.
CPC ........... *H04L 12/583* (2013.01); *H04L 51/063* (2013.01); *H04L 12/5895* (2013.01)

(58) Field of Classification Search
CPC ... H04L 51/063; H04L 12/583; H04L 12/5895
USPC ........................................................ 709/206
See application file for complete search history.

(56) References Cited

U.S. PATENT DOCUMENTS

| | | | | |
|---|---|---|---|---|
| 5,903,723 | A * | 5/1999 | Beck et al. | 709/200 |
| 6,275,848 | B1 * | 8/2001 | Arnold | 709/206 |
| 7,194,514 | B1 | 3/2007 | Yen et al. | |
| 7,882,185 | B2 * | 2/2011 | Nagarajan | G06Q 10/107 709/200 |
| 8,488,751 | B2 * | 7/2013 | Skakkebaek | 379/88.13 |
| 9,070,114 | B2 * | 6/2015 | Dumitru | G06Q 10/107 |
| 2002/0059384 | A1 * | 5/2002 | Kaars | 709/206 |
| 2004/0015552 | A1 * | 1/2004 | Sugawara | 709/206 |
| 2005/0108335 | A1 * | 5/2005 | Naick et al. | 709/206 |
| 2005/0188026 | A1 * | 8/2005 | Hilbert et al. | 709/206 |
| 2005/0210111 | A1 * | 9/2005 | Fukudome | 709/206 |
| 2006/0045124 | A1 * | 3/2006 | Dahlstrom et al. | 370/465 |
| 2006/0123085 | A1 | 6/2006 | Burns et al. | |
| 2006/0224679 | A1 * | 10/2006 | Kikuchi et al. | 709/206 |
| 2008/0034063 | A1 * | 2/2008 | Yee | 709/219 |

FOREIGN PATENT DOCUMENTS

| | | | |
|---|---|---|---|
| EP | 1420554 A1 | 5/2004 | |
| EP | 1796336 A1 | 6/2007 | |

OTHER PUBLICATIONS

International Search Report and Written Opinion, issued by European Patent Office (ISA), received in corresponding PCT Application No. PCT/IB2009/00029, Apr. 22, 2009, 11 pages.

* cited by examiner

*Primary Examiner* — Philip Chea
*Assistant Examiner* — Roberts B McAdams
(74) *Attorney, Agent, or Firm* — Ditthavong & Steiner, P.C.

(57) ABSTRACT

A method includes receiving an electronic message by a communication entity; determining if an indicator in the electronic message identifies the communication entity as an entity to retrieve a content referenced in the electronic message; and retrieving the content from a storage unit if the indicator identifies the communication entity as an entity to retrieve the content. An address of the content is identified in the electronic message.

12 Claims, 6 Drawing Sheets

SYSTEMS AND METHODS FOR ADDING MEDIA CONTENT TO ELECTRONIC MESSAGES

TECHNICAL FIELD

The present invention relates generally to the field of electronic messaging and, more particularly, to adding media content to electronic messages.

BACKGROUND OF THE INVENTION

The Open Mobile Alliance (OMA) Converged IP Messaging (CPM) work aims to develop future interpersonal interactive multimedia communication services which accommodate different user experiences of the existing IP communication services such as Store-and-forward messaging, instant messaging, Push to Talk over Cellular (PoC), Voice and Video communication and conferences.

The work is directed at specifying future messaging functionalities that support the creation of a range of IP-based services needing messaging functionality and provide a common platform for the development of future IP services. The objective of OMA CPM is to consolidate common functionalities of existing messaging services and new features introduced by the convergence of communications brought by SIP-based technologies.

SUMMARY OF THE INVENTION

One aspect of the invention relates to a method comprising receiving an electronic message by a communication entity; determining if an indicator in the electronic message identifies the communication entity as an entity to retrieve a content referenced in the electronic message; and retrieving the content from a storage unit if the indicator identifies the communication entity as an entity to retrieve the content. An address of the content is identified in the electronic message.

In another aspect of the invention, a communication entity includes a processor and a memory unit communicatively connected to the processor. The memory unit includes computer code for receiving an electronic message, computer code for determining if an indicator in the electronic message identifies the communication entity as an entity to retrieve a content referenced in the electronic message, and computer code for retrieving the content from a storage unit if the indicator identifies the communication entity as an entity to retrieve the content. An address of the content is identified in the electronic message.

In another aspect of the invention, a program product, embodied on a computer-readable medium, comprises computer code for performing the following steps: receiving an electronic message, determining if an indicator in the electronic message identifies the communication entity as an entity to retrieve a content referenced in the electronic message, and retrieving the content from a storage unit if the indicator identifies the communication entity as an entity to retrieve the content, wherein an address of the content is identified in the electronic message.

Another aspect of the invention relates to a method for assigning a communication entity to retrieve a content to be inserted in an electronic message, placing an indicator in the electronic message identifying the communication entity as an entity to retrieve the content to be inserted in the electronic message, and transmitting the message for receipt by the communication entity.

In yet another aspect of the invention, a communication device includes a processor and a memory unit communicatively connected to the processor. The memory unit includes computer code for assigning a communication entity to retrieve a content to be inserted in an electronic message and placing an indicator in the electronic message identifying the communication entity as an entity to retrieve the content to be inserted in the electronic message, and computer code for transmitting the message for receipt by the communication entity.

In another aspect of the invention, a program product, embodied on a computer-readable medium, comprises computer code for performing the following steps: assigning a communication entity to retrieve a content to be inserted in an electronic message, placing an indicator in the electronic message identifying the communication entity as an entity to retrieve the content to be inserted in the electronic message, and transmitting the message for receipt by the communication entity.

DETAILED DESCRIPTION OF THE PREFERRED EMBODIMENTS

Users in a communication network may send electronic messages, such as text messages, through one or more networks to other users. In addition to text, the messages may include additional content, such as images or video files for example. In many cases, this additional content may be stored on a separate storage unit, such as a content server for example. In such cases, the sending user typically references content on the separate storage unit, such as an http server. The receiving user may then retrieve the additional content using a mechanism such as http GET for example. Examples of electronic messages include, but are not necessarily restricted to, text messages, multimedia messages and signaling messages associated with initiating a communication session.

Figure 1:
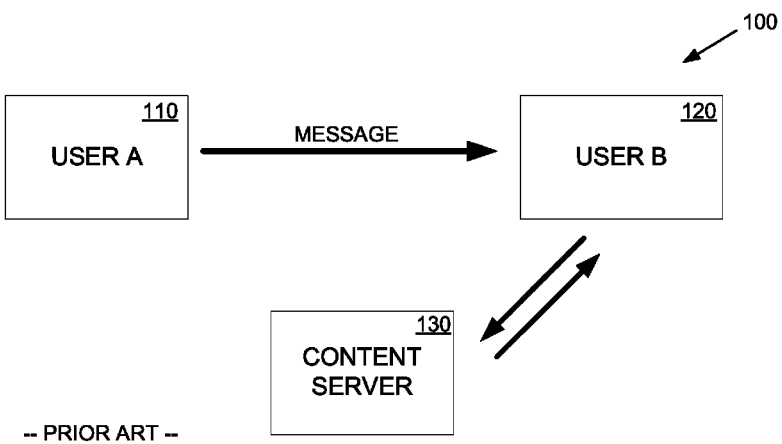
FIG. 1 is an illustration of an exemplary content retrieval system.

FIG. 1 illustrates an exemplary content retrieval system 100. A sending user at a first communication entity 110 sends a message to a receiving user at a second communication entity 120. The various communication entities may take the form of any of a variety of communication devices, such as a desktop computer, a handheld computer, a notebook computer, a wireless telephone, a personal digital assistant, a wireless email device, a personal media player or the like. The message may be sent through one or more communication networks, such as the Internet or cellular networks, for example.

Upon receipt of the message, the second communication entity 120 of the receiving user retrieves content from a location specified within the message. For example, the message may include a URL or other means of identifying a storage location or address. The second communication entity 120 then accesses a storage unit 130, such as a content server for example, to retrieve the content. In this regard, the second communication entity 120 may access the content server 130 through one or more communication networks.

However, in most cases, the communication between two users is not direct. Often, intermediate nodes, such as communication servers, are involved to direct the communication appropriately. In such cases, it may be desirable to allow retrieval of the content by communication entities other than the end recipient of the message.

Figure 2:
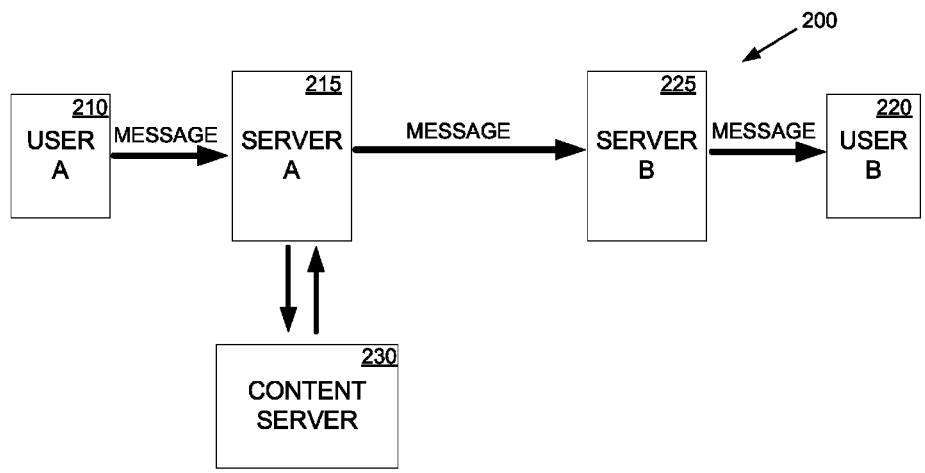
FIG. 2 illustrates a communication system in accordance with an exemplary embodiment of the present invention.

According to an exemplary embodiment of the present invention, the content indirection mechanism may be extended to cover the cases where a sender can explicitly point to or indicate which entity in the communication path should perform the content indirection. FIG. 2 illustrates a communication system 200 in accordance with an exemplary embodiment of the present invention. In the illustrated system 200, a sending user sends an electronic message from a first communication entity 210 directed for a receiving user at a second communication entity 220. The message is directed to a first communication server 215 which may be associated with a network of the first communication entity 210 of the sending user. For example, the first communication server 215 may be a server associated with the cellular network of the first communication entity 210. In another example, the communication system 200 may represent a network of a multi-office company. The first communication server 215 may be associated with all users in one office of the company.

The message from the sending user may specify a location, such as a URL, identifying a storage location or address of additional content to be retrieved and included in the message. Additionally, in accordance with an exemplary embodiment of the present invention, the message includes an indicator identifying the communication entity in the communication path which is assigned the responsibility of retrieving the additional content, or the entity to retrieve the referenced content. In the exemplary illustration of FIG. 2, the message includes an indicator identifying the first communication server 215 as the entity to retrieve the referenced content.

Upon receiving the message, the first communication server 215 detects the indicator and notices that it is identified as the entity to retrieve the referenced content. Based on the indicator, the communication server accesses the content server 230 identified in the message as the storage location and retrieves the identified content. The content is then added to the message, and the message is then forwarded by the communication server 215 to the next communication entity in the communication path. In the illustrated example, the next communication entity is a second communication server 225 associated with the communication entity 220 of the receiving user.

Figure 3:
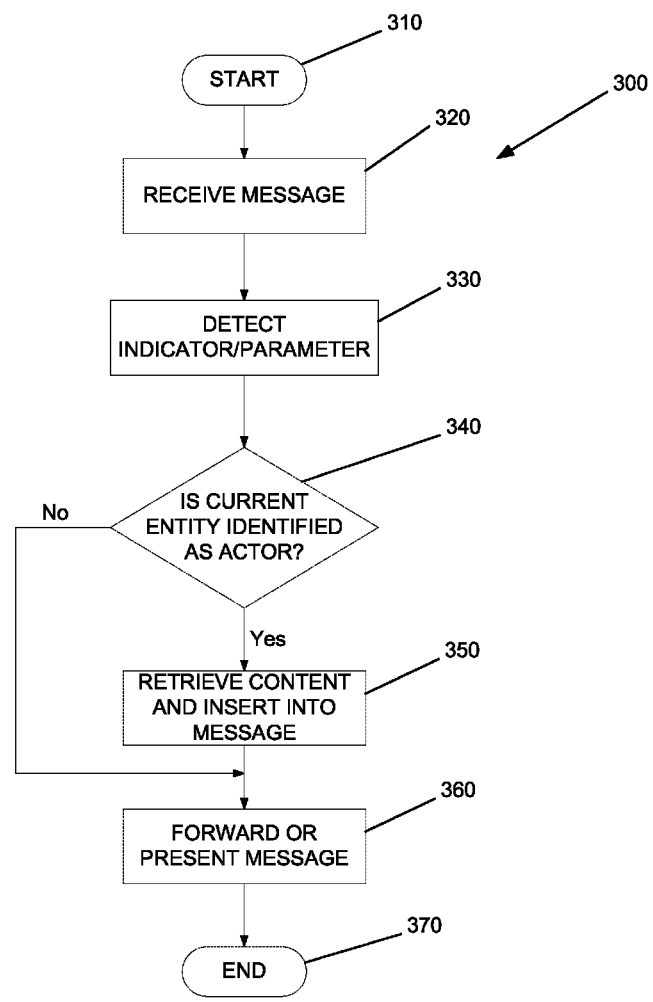
FIG. 3 is a flowchart illustrating a method in accordance with an exemplary embodiment of the present invention.

FIG. 3 is a flowchart illustrating a method 300 in accordance with an exemplary embodiment of the present invention. The method 300 may be implemented by any entity in the communication path between a sending user and a receiving user, including the receiving user.

In accordance with the method 300, a communication entity in the communication path receives the message originated by the sending user (block 320). At block 330, the communication entity detects an indicator identifying the entity to retrieve the referenced content. In accordance with an exemplary embodiment of the present invention, an extension parameter "<actor>" referencing the identity of the communication entity required to perform the content-indirection is provided. In one exemplary embodiment, the extension parameter may be implemented as a Content-Type parameter of the message/external-body MIME type as follows:

Content-Type: message/external-body; actor='CPM_Server-ID@network.com'

In one exemplary embodiment, the extension parameter may be implemented as a general Content-Type parameter to be inserted in any Content-Type header field of a message:

Content-Type: multipart/mixed; boundary=boundary32; actor='CPM_Server-ID @ network.com'

In another exemplary embodiment, the extension parameter may be implemented as a URI parameter of the message/external-body MIME type as follows:

Content-Type: message/external-body; access-type="URL"; URL="http://www.network.com/content-address; actor='CPM_Server-ID @ network.com'

Exemplary embodiments of the present invention may also be applied in communication sessions initiation. In such case, the indicator may be provided in the Session Initiation Protocol (SIP) header fields for example to indicate which entity is to perform content indirection.

Referring again to FIG. 3, upon detection of the indicator in the message, the communication entity determines if it is identified as the actor, or the entity to retrieve the referenced content (block 340). If the current communication entity is not identified as the entity to retrieve the referenced content, the method 300 proceed to forward the message to the next entity or to present the message to the user (block 360). In this regard, if the current communication entity is an intermediate node in the communication path, the message is forwarded to the next communication entity. On the other hand, if the current communication entity is the receiving user's communication entity, the message is presented to the user.

If, at block 340, it is determined that the current communication entity is identified as the entity to retrieve the referenced content, then at block 350 the additional content is retrieved from the storage unit identified in the message and inserted into the message. At block 360, the message is either forwarded to the next communication entity or presented to the receiving user.

An exemplary messaging may be described with reference again to FIG. 2. In the illustration of FIG. 2, User A sends a file to User B. User A requests that server A 215 fetch a reference content to be included in the message, and the content-disposition is "render." Thus, the message from User A's communication entity 210 to server A 215 may be as follows:

```
MSRP dsdfoe38sd SEND
To-Path: msrp://alice.example.com:7777/iau39soe2843z;tcp
From-Path: msrp://bob.example.com:8888/9di4eae923wzd;tcp
Message-ID: 456so39s
Byte-Range: 1-374/374
Content-Type: multipart/mixed; boundary= Example
    -- Example
    Content-Type: message/external-body;
    access-type="URL";
    URL="http://www.example.com/mountain_climbing/image1.png";actor=
'CPM_Server-ID@network.com'
  <CRLF>
        Content-Disposition: render
    -- Example
    Content-Type: text/plain;
        I just remembered how you look when climbing, see attached picture
--zz993453--
-------dsdfoe38sd$
```

Server A 215 is identified as the entity to retrieve the referenced content in the message. Accordingly, server A retrieves the content from the content server 230 and inserts it into the message. Thus, the message from server A 215 to User B or server B is as follows:

```
MSRP dsdfoe38sd SEND
To-Path: msrp://alice.example.com:7777/iau39soe2843z;tcp
From-Path: msrp://bob.example.com:8888/9di4eae923wzd;tcp
Message-ID: 456so39s
Byte-Range: 1-374/374
Content-Type: multipart/mixed; boundary= Example
    -- Example
    Content-Type: image/png
    Content-Disposition: render
    Content-Length :
        <image/png_object>
    -- Example
    Content-Type: text/plain;
        I just remembered how look when climbing, see attached picture
--zz993453--
-------dsdfoe38sd$
```

Without in any way limiting the scope, interpretation, or application of the claims appearing below, it is possible that a technical advantage of one or more of the exemplary embodiments disclosed herein is not limiting the retrieval of a content to be added to a message to the receiving communication entity. Rather, in accordance with at least one embodiment of the present invention, any entity in the communication path may be identified as the entity to retrieve a referenced content via a non-SIP method. Another possible technical advantage of one or more of the exemplary embodiments disclosed herein may be a reduction in signaling and communication load required to retrieve the referenced content. Another technical advantage of one or more of the exemplary embodiments disclosed herein may be efficient use of resources provided by communication network.

Figure 4:
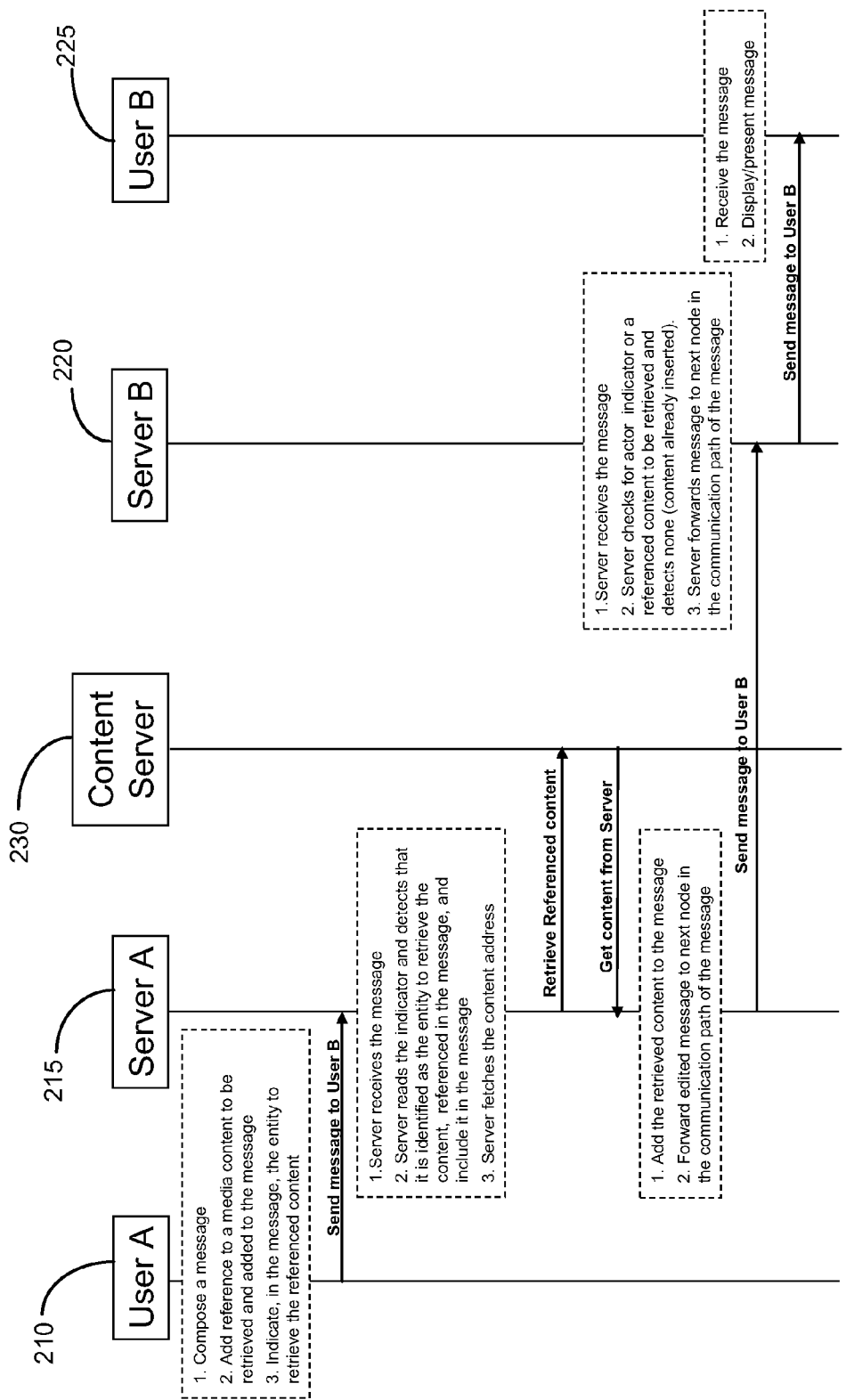
FIG. 4 is a flowchart illustrating an example of a message processing in accordance with an exemplary embodiment of the present invention.
Figure 5:
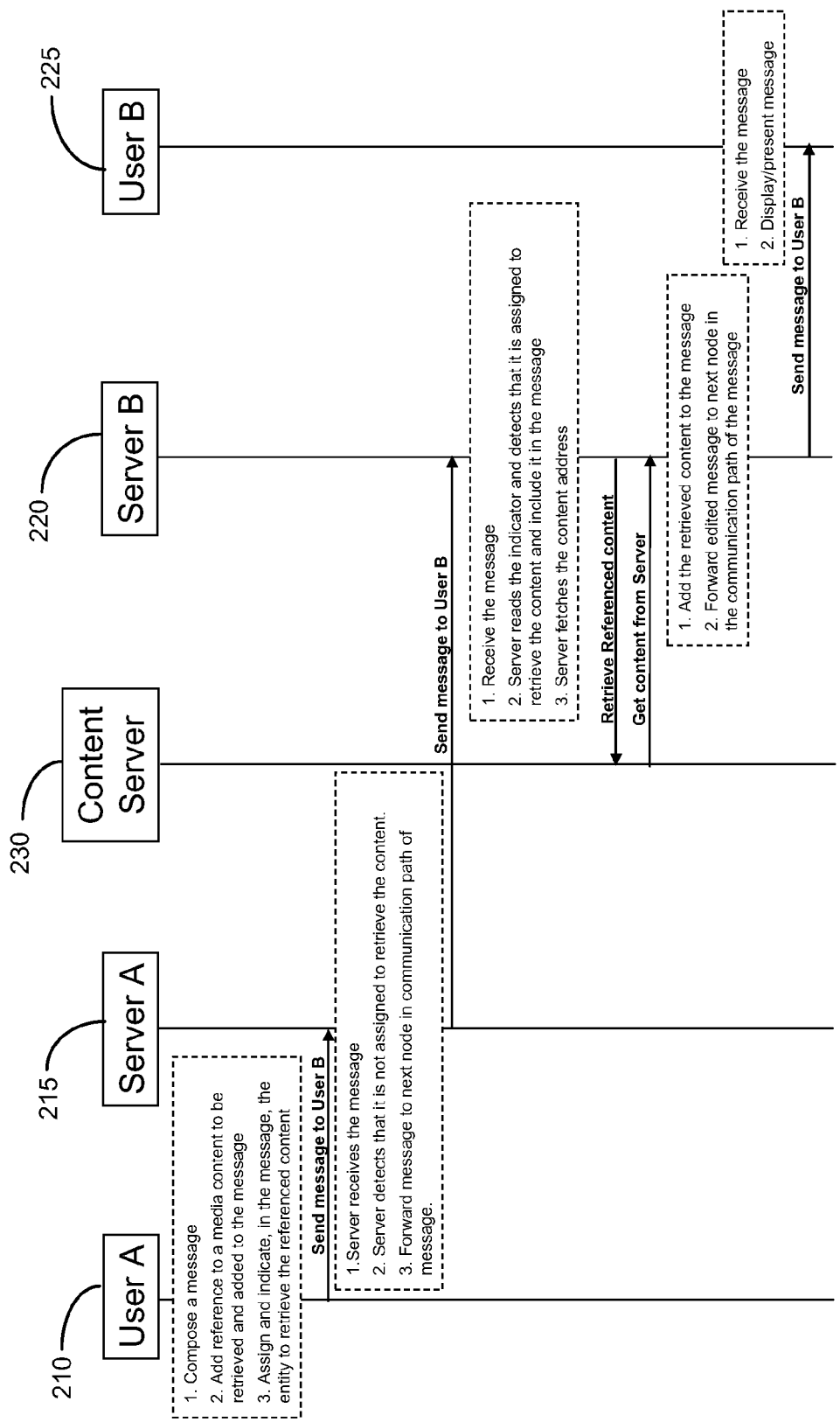
FIG. 5 is a flowchart illustrating another example of a message processing in accordance with an exemplary embodiment of the present invention.

FIGS. 4 and 5 illustrate two examples of the processing of a message in accordance with embodiments of the present invention. In each of FIGS. 4 and 5, an electronic message is transmitted from User A 210 to User B 220. User A 210 composes the electronic message on a user device, such as a laptop, handheld or other such device. User A 210 (or the device of User A) assigns another communication entity as the entity to retrieve a content, such as an image or a video, from a storage unit, such as the Content Server 230. The assigning of the communication entity to retrieve the content includes placing an indicator in the electronic message identifying the communication entity. In the example of FIG. 4, User A 210 assigns Server A 215 as the entity to retrieve the content, while in the example of FIG. 5, User A 210 assigns Server B 225 as that entity to retrieve the content.

The assignment of a communication entity to retrieve content and to insert the content into the electronic message may be based on any of a variety of factors. For example, in one embodiment, User A 210 (or the device of User A) may assign a particular communication entity based on prior access of the Content Server 230 by the assigned communication entity. In another embodiment, the assignment is based on the location of the content to be retrieved. For example, the assignment may be based on an address of reference of the content or the Content Server 230. In yet another embodiment, the assignment may be based on an association between User A 210 and the assigned entity. For example, as illustrated in FIG. 4, User A 210 may assign Server A 215 since Server A 215 is a network server for the network of User A 210. In another embodiment, the assignment may be based on availability of various resources. For example, the assigned communication entity may be selected based on available bandwidth in the assigned entity or may be selected in a way to minimize the use of network resources.

Referring now to FIG. 4, when Server A 215 receives the message, it reads the indicator and detects that Server A 215 is identified as the entity to retrieve the content referenced in the electronic message. Accordingly, Server A 215 retrieves the referenced content from the Content Server 230 and adds the content to the electronic message. Server A 215 then forwards the edited electronic message to the next communication entity in the communication path, which in the illustrated example is Server B 225.

Upon receipt of the edited message by Server B 225, Server B 225 checks the indicator in the electronic message and notes that Server B 225 is not assigned as the entity to retrieve any content. Server B 225 then forwards the message to the next entity in the communication path. In the illustrated example, the next entity is the intended recipient of the electronic message, User B 220. User B 220 may also check the indictor and, upon determination that it is not assigned as the entity to retrieve any content, User B 220 displays or presents the message to the user. Of course, each of the communication entities may perform other functions prior to forwarding or presenting the message.

Referring now to FIG. 5, when Server A 215 receives the message, Server A 215 checks the indicator in the electronic message and notes that Server A 215 is not assigned as the entity to retrieve any content. Server A 215 then forwards the electronic message to the next communication entity in the communication path, which in the illustrated example is Server B 225.

Upon receipt of the edited message by Server B 225, Server B 225 reads the indicator and detects that Server B 225 is identified as the entity to retrieve the content referenced in the electronic message. Accordingly, Server B 225 retrieves the referenced content from the Content Server and adds the content to the electronic message. Server B 225 then forwards the message to the next entity in the communication path. In the illustrated example, the next entity is the intended recipient of the electronic message, User B 220. As in the example of FIG. 4, User B 220 may also check the indictor and, upon determination that it is not assigned as the entity to retrieve any content, User B 220 displays or presents the message to the user.

Figure 6:
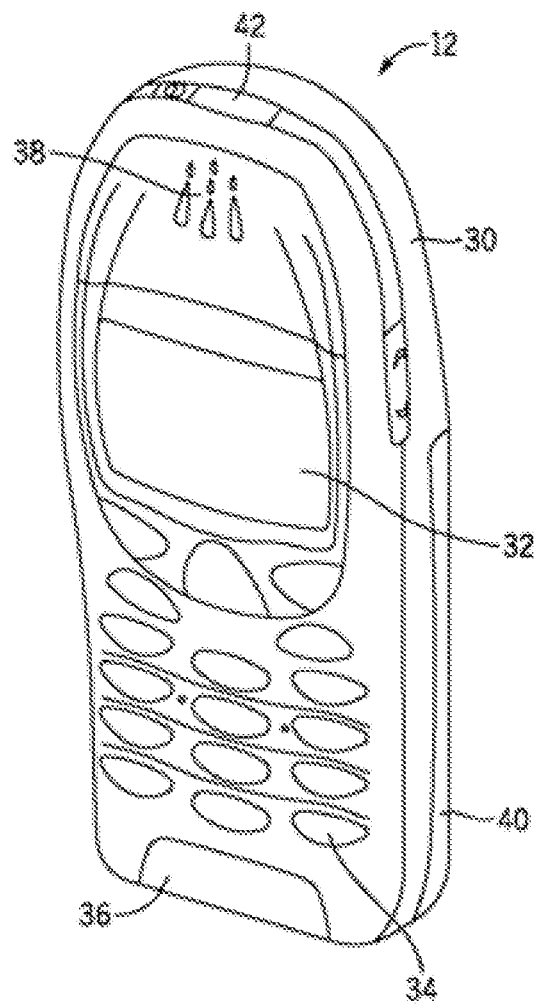
FIG. 6 is a perspective view of an electronic device that can be used in conjunction with the implementation of various embodiments.
Figure 7:
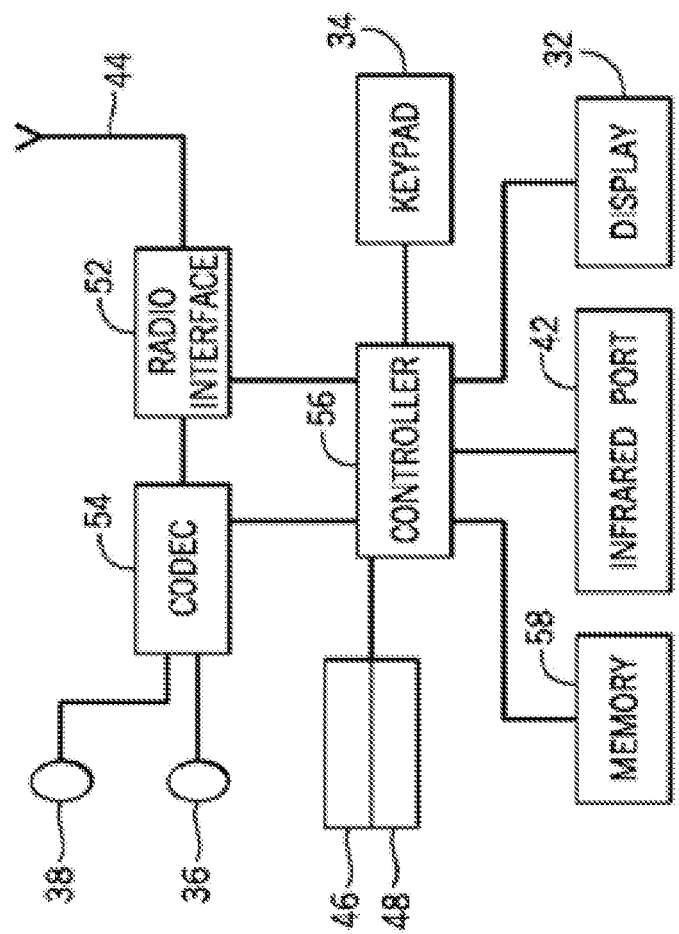
FIG. 7 is a schematic representation of the circuitry which may be included in the electronic device of FIG. 6.

FIGS. 6 and 7 show one representative electronic device 12 which may serve as a client station and within which embodiments of the present invention may be partially or fully implemented. It should be understood, however, that the present invention is not intended to be limited to one particular type of electronic device 12. The electronic device 12 of FIGS. 6 and 7 includes a housing 30 which forms the exterior of the device. The housing 30 may protect certain components from the external environment and provides a user with access to other components. A display 32 is provided in the form of a liquid crystal display, for example, to allow the user to view text, images, video and the like.

A keypad 34 and a microphone 36 allow user inputs to be received by the electronic device 12. The keypad 34 may be used to enter alphanumeric inputs by the user, while the microphone 36 may be used to either provide audio inputs to the electronic device 12 or to allow the user to verbally communicate through a network. An ear-piece 38 allows a user to verbally communicate with another user. The electronic device 12 is powered by a battery 40, which is preferably a rechargeable battery. The microphone 36 and the ear piece 38 may be coupled to codec circuitry 54, which may be coupled to a device controller 54 and a radio interface 52.

An infrared port 42 may be provided to allow communication with nearby devices, for example. The electronic device 12 may communicate with a network through, for example, a base station via radio communication which may be facilitated by an antenna 44. The antenna 44 may be tuned for communication at one or more ranges of frequencies. The antenna 44 may be coupled to the radio interface circuitry 52, which is coupled to the controller 56 and the codec circuitry 54. In this regard, the controller 56 may be a central processing unit for controlling the operation of the electronic device 12.

The electronic device 12 may be adapted to incorporate a smart card 46 to identify the user and to provide secure communication, for example. A card reader 48 may be provided to read the smart card 46 and to relay the information from the smart card 46 to the device controller 56. A storage unit, such as memory 58, may be provided to store data (e.g., contact list) or programs to be accessed by the controller 56.

Various embodiments described herein are described in the general context of method steps or processes, which may be implemented in one exemplary embodiment by a computer program product, embodied in a computer-readable medium, including computer-executable instructions, such as program code, executed by computers in networked environments. Embodiments of the present invention may be implemented partially or fully in various entities in a communication network. For example, in one embodiment, the insertion in the message of information relating to the actor may be implemented in a user terminal, such as a laptop, handheld or other such device of a user sending the message. The detection of the information relating to the actor and the retrieval of the media content and its insertion in the message may be implemented in one or more network servers, for example, or in a user terminal receiving the message such as a desktop, laptop, a handheld device and the like. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments may be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
  receiving an electronic message by a communication entity, the electronic message comprising an assignment of a unique entity to retrieve a content, the unique entity being identified by a specific address;
  determining if an indicator in the electronic message identifies said communication entity as the unique entity;
  determining to retrieve said content from a storage unit if the indicator identifies the communication entity as the unique entity, wherein an address of the content is identified in the electronic message; and
  wherein the assigning is based at least on one of the availability of resources in the assigned unique communication entity, prior access of the storage unit by the assigned unique communication entity, location of the storage unit and the address of the content.

2. The method of claim 1, further comprising:
inserting the content retrieved from the storage unit into the electronic message; and
forwarding the electronic message to another communication entity.

3. The method of claim 1, wherein the indicator is at least one of a parameter in the electronic message and a parameter in a header field of the electronic message.

4. The method of claim 1, wherein the electronic message comprises at least one of the following: Session Initiation Protocol (SIP) signaling protocols, Message Session Relay Protocol (MSRP) for messaging.

5. An apparatus, comprising:
at least one processor; and at least one memory including computer program code for one or more programs, the at least one memory and the computer program code configured to, with the at least one processor, cause the apparatus to perform at least the following:
receiving, by a communication entity, an electronic message including an assignment of a unique entity to retrieve a content, the unique entity being identified by a specific address;
determining if an indicator in the electronic message identifies the communication entity as the unique entity to retrieve the content referenced in the electronic message;
retrieving said content from a storage unit if the indicator identifies the communication entity as an entity to retrieve the content, wherein an address of the content is identified in the electronic message; and
wherein the assigning is based at least on one of the availability of resources in the assigned unique communication entity, prior access of the storage unit by the assigned unique communication entity, location of the storage unit and the address of the content.

6. The apparatus of claim 5, wherein the memory unit further comprises:
computer code for inserting content from the storage unit into the electronic message; and
computer code for forwarding the electronic message to another communication entity.

7. The apparatus of claim 5, wherein the communication entity is at least one of an intermediate node in a communication path, a network server or a receiving user terminal.

8. The apparatus of claim 5, wherein the storage unit is a content server.

9. The apparatus of claim 5, wherein the indicator is at least one of a parameter in the electronic message or a parameter in a header field of the electronic message.

10. The apparatus of claim 5, wherein the electronic message comprises at least one of the following:
Session Initiation Protocol (SIP) signaling protocols, Message Session Relay Protocol (MSRP) for messaging.

11. A method, comprising:
determining to assign a unique communication entity to retrieve a content to be inserted in an electronic message, the unique communication entity being identified by a specific address, wherein said determining to assign includes placing an indicator in the electronic message identifying the unique communication entity as the entity to retrieve the said content to be inserted in the electronic message;
determining to transmit the message for receipt by the unique communication entity; and
wherein the assigning is based at least on one of the availability of resources in the assigned unique communication entity, prior access of the storage unit by the assigned unique communication entity, location of the storage unit and the address of the content.

12. An apparatus, comprising:
at least one processor; and at least one memory including computer program code for one or more programs, the at least one memory and the computer program code configured to, with the at least one processor, cause the apparatus to perform at least the following:
determining to assign a unique communication entity to retrieve a content to be inserted in an electronic message, the unique communication entity being identified by a specific address, wherein said assigning includes placing an indicator in the electronic message identifying the unique communication entity as the entity to retrieve the said content to be inserted in the electronic message;
determining to transmit the message for receipt by the unique communication entity; and
wherein the assigning is based at least on one of the availability of resources in the assigned unique communication entity, prior access of the storage unit by the assigned unique communication entity, location of the storage unit and the address of the content.

* * * * *